United States Patent
Wester et al.

(10) Patent No.: US 7,081,184 B2
(45) Date of Patent: *Jul. 25, 2006

(54) PROCESS FOR MAKING A VERY LOW COD UNBLEACHED PULP

(75) Inventors: Brian Wester, Sumner, WA (US); Michael D. Vrbanac, Seattle, WA (US); Julie A. Reimer, Seattle, WA (US); Peter K. Lau, Kamloops (CA); Brian E. Dennis, Kamloops (CA); David W. Bickell, Kamloops (CA)

(73) Assignee: Weyerhaeuser Company, Federal Way, WA (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/330,725

(22) Filed: Dec. 26, 2002

(65) Prior Publication Data

US 2003/0213568 A1   Nov. 20, 2003

Related U.S. Application Data

(63) Continuation-in-part of application No. 10/209,497, filed on Jul. 30, 2002, now abandoned, which is a continuation of application No. PCT/US02/15522, filed on May 15, 2002.

(51) Int. Cl.
*D21C 9/02* (2006.01)
*D21C 9/18* (2006.01)

(52) U.S. Cl. .................. 162/90; 162/17; 162/60; 162/91

(58) Field of Classification Search .......... 162/60, 162/65, 56, 90, 231, 8, 17, 29, 70, 71, 145
See application file for complete search history.

(56) References Cited

U.S. PATENT DOCUMENTS

| | | | | | |
|---|---|---|---|---|---|
| 2,030,383 | A | * | 2/1936 | Luth et al. | 162/90 |
| 2,054,854 | A | * | 9/1936 | Dreyfus | 162/76 |
| 2,645,576 | A | * | 7/1953 | Bate et al. | 162/60 |
| 4,274,913 | A | * | 6/1981 | Kikuiri et al. | 162/65 |
| 4,806,203 | A | * | 2/1989 | Elton | 162/19 |
| 4,971,658 | A | | 11/1990 | Henricson et al. | |
| 5,429,717 | A | * | 7/1995 | Bokstrom et al. | 162/60 |

(Continued)

FOREIGN PATENT DOCUMENTS

WO   WO 95/20066 A1   7/1995

(Continued)

OTHER PUBLICATIONS

"Forming Handsheets For Physical Tests of Pulp," *TAPPI*, T 205 sp-95, 1995 pp. 5-7.

(Continued)

*Primary Examiner*—Eric Hug
(74) *Attorney, Agent, or Firm*—Christensen, O'Connor, Johnson & Kindness

(57) ABSTRACT

A process for making a pulp product that has a low COD is comprised of soaking and washing pulp in alkaline water for a sufficient time so that the COD after soaking and washing is less than or equal to 2.0 kg/1000 kg of dry pulp. The process includes repetitively soaking and washing an unbleached pulp in alkaline water that is never allowed to drop below pH 7.0. In this process, the pulp is soaked and washed for a total of at least 220 minutes at an elevated temperature to produce the pulp product that has a low COD.

14 Claims, 1 Drawing Sheet

U.S. PATENT DOCUMENTS 6,245,196 B1 * 6/2001 Martin et al. .................. 162/11
2002/0112827 A1 8/2002 Merkley et al.

FOREIGN PATENT DOCUMENTS

WO     WO 02/33164 A2    4/2002

OTHER PUBLICATIONS

"Moisture In Pulp, Paper and Paperboard," *TAPPI*, T 412 om-94, 1994, pp. 1-3.

Harper, S., and M. Grenggs, "Resin Extaction and Effects on Pulp Quality," *Proceedings of the 54th Appita Annual Conference*, Melbourne, Apr. 3-6, 2000, pp. 575-580.

Stromberg, C.B., "Washing For Low Bleach Chemical Consumption," in Thomas W. Joyce (ed.), *Environmental Issues: A TAPPI Press Anthology of Published Papers*, TAPPI Press, Atlanta, 1990 pp. 230-238.

Stromberg, C.B., Washing Of Dissolved Organic Solids From Pulp, *Paper Asia*, Oct. 1994, pp. 32-39.

* cited by examiner

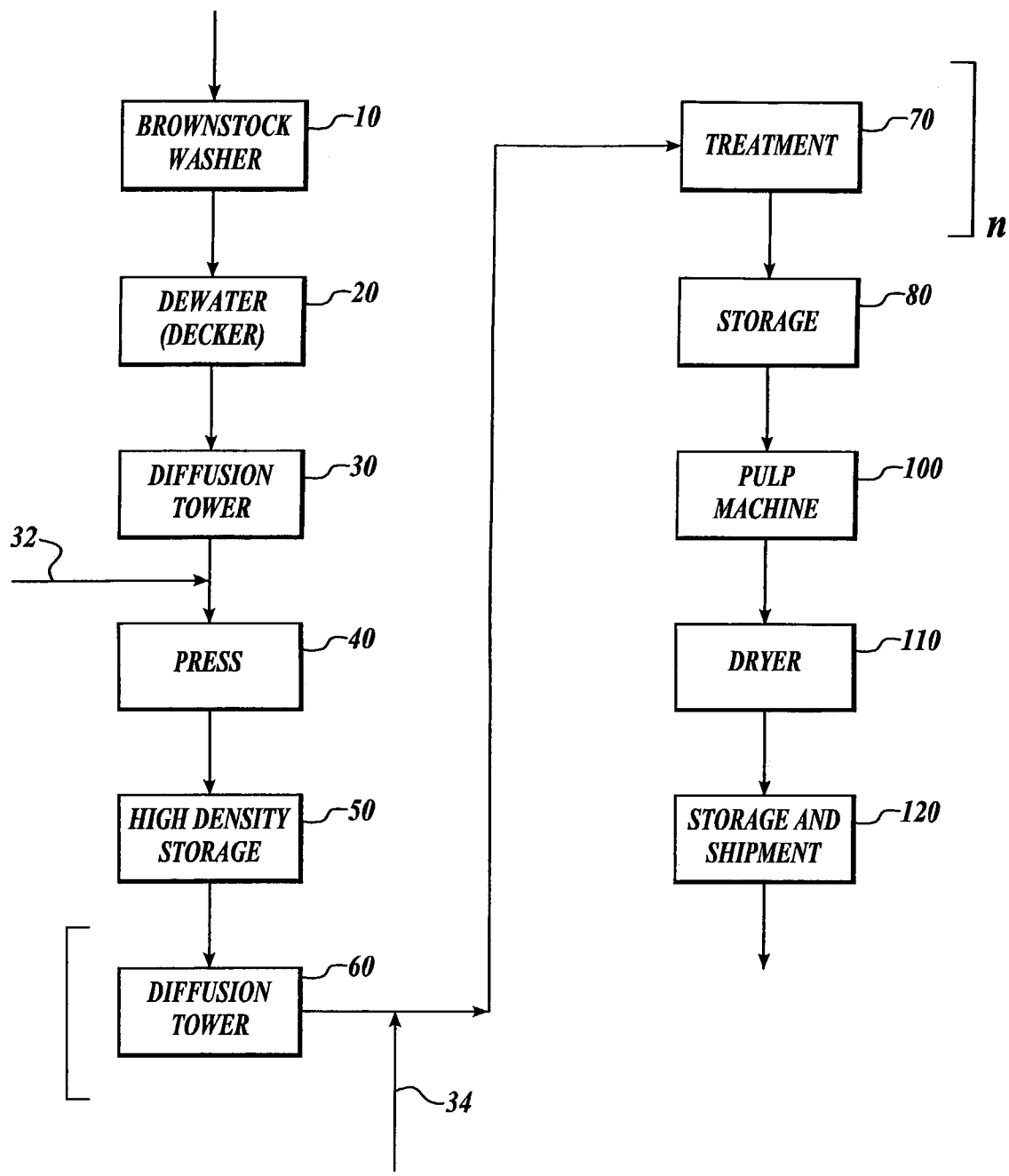

PROCESS FOR MAKING A VERY LOW COD UNBLEACHED PULP

CROSS-REFERENCES TO RELATED APPLICATIONS

This application is a continuation-in-part of U.S. application Ser. No. 10/209,497, filed Jul. 30, 2002, now abandoned, which in turn is a continuation of Application No. PCT/US02/15522, filed May 15, 2002, priority from the filing dates of which is hereby claimed under 35 U.S.C. § 120.

FIELD OF THE INVENTION

The present invention relates to a process for making cellulosic pulps, and more particularly, to a process for making an unbleached cellulosic pulps having a low COD that are useful in cementitious products.

BACKGROUND OF THE INVENTION

The internal structures of houses and other buildings are commonly protected from environmental elements by exterior siding materials. These siding materials are typically planks or panels composed of wood, concrete, brick, aluminum, stucco, wood composites, or fiber-cement composites. A common fiber-cement composite is fiber-cement siding, which is generally composed of cement, silica sand, unbleached wood pulp, and various additives. Fiber-cement siding offers several advantages over other types of siding materials, such as wood siding: it is weatherproof, relatively inexpensive to manufacture, fire-resistant, and invulnerable to rotting or insect damage.

Commercial fiber-reinforced cement siding planks or panels are made using the Hatschek process. The Hatschek process was initially developed for the production of asbestos composites, but it is now used for the manufacture of non-asbestos, cellulose fiber reinforced cement composites. In this process, unbleached cellulose fibers are re-pulped in warm water at an alkaline pH of 11 to 12.5; the re-pulped fibers are refined and then mixed with cement, silica sand, and other additives to form a mixture. The fiber-cement mixture, is deposited on a felt band substrate, vacuum dewatered, and cured to form a fiber reinforced cement matrix in sheet form.

The curing of the cement matrix is hindered by the presence of sugars or other organic materials. These materials retard the hydration reaction of cement and thereby retard the setting or hardening of a mortar or concrete. Cement setting is purposely retarded in ready-mix concrete during long hours of transportation, for mitigation of stress due to temperature (heat) when used in a large-sized concrete structures, and for decorated wash finishes. When these organic materials are measured, the manufacturers of fiber-cement siding have observed an inverse relationship between the amount of these materials in an unbleached pulp and the strength properties of the final product. One means for measuring the amount of these materials is the chemical oxygen demand (COD) test. When considering the detrimental effect of these materials on strength properties, it is apparent that there are needs in the art for very low COD pulp. The present invention fulfills these needs and provides further related advantages.

SUMMARY OF THE INVENTION

The present invention provides a process for making pulp product comprising an unbleached pulp that is soaked and washed only in alkaline water, and after soaking and washing, it has a COD less than or equal to 2.0 kg/1000 kg of dry pulp, and preferably less than or equal to 1.8 kg/1000 kg. This pulp is produced by repetitively soaking unbleached pulp in alkaline water that is at an elevated temperature so that organics will diffuse out of the fiber and into the water. Subsequently, the repetitively soaked and washed pulp is then preferably dewatered and dried.

BRIEF DESCRIPTION OF THE DRAWINGS

The foregoing aspects and many of the attendant advantages of this invention will become more readily appreciated as the same become better understood by reference to the following detailed description and the accompanying drawings, wherein:

FIG. 1 illustrates the steps of the caustic washing process for the present invention.

DETAILED DESCRIPTION OF THE PREFERRED EMBODIMENT

The present invention provides a process for making a low chemical oxygen demand (COD) pulp that is particularly useful for reinforcing fiber cement products. The process is most preferably an unbleached Kraft (sulfate) pulping process. Other low COD pulps and processes for making such pulps are described in U.S. patent application Ser. No. 10/209,497, titled VERY LOW COD UNBLEACHED PULP and U.S. patent application Ser. No. 10/209,446, titled PROCESS FOR PRODUCING VERY LOW COD UNBLEACHED PULP, the disclosures of which are herein expressly incorporated by reference in their entirety. In addition, a VERY LOW COD UNBLEACHED PULP, U.S. patent application Ser. No. 10/330,529, filed herewith, is incorporated by reference in its entirety. However, a wide variety of pulped cellulosic fibers can be used, which are derived from wood and non-wood sources. Of all the pulp sources, wood pulp is the most commonly employed because of its availability and price.

To obtain suitable wood pulp fibers, the Kraft (sulfate) pulping process is the most preferred method. Using this process and considering the desired composite properties, the preferred wood fiber source is long-fibered coniferous wood species. Examples of these species include the following: Southern pine, Douglas fir, spruce, hemlock, and Radiata pine. In addition to these wood fiber sources, other chemical pulps can be used that include pulps made from short or long fibered wood species or recycled, wood pulp fibers. Other fibers that can be used include mini-chip pulp which is derived from sawdust, shavings, pin chips and other waste wood materials. The Weyerhaeuser Company of Federal Way, Washington, sells one such mini-chip pulp under the trademark TYEE. Short wood fibers, which are typically produced from hardwood species such as eucalyptus, can also be used. The processes to produce these wood pulp fibers are well known to those skilled in the art of pulp manufacturing. These fibers are commercially available from a number of companies, including the Weyerhaeuser Company. In contrast to wood pulp fiber sources, there are other natural cellulosic fiber sources which include straw, flax, kenaf, hemp, or similar materials. Like wood-based fibers, these non-wood fibers may also be pulped and subsequently used in fiber cement-based composites. In addition, combinations or mixtures of cellulosic fibers can be used, such as mixtures of various wood pulp fibers, mixtures of wood pulp fibers and other natural cellulosic fibers or mixtures of other natural cellulosic fibers.

Referring to FIG. 1, unbleached pulp, preferably unbleached kraft pulp with a Kappa number less than or equal to 30, is first passed through conventional brown stock washers 10 and a brown stock decker 20. The unbleached pulp from the decker is at an alkaline condition and must be maintained at an alkaline condition (pH greater than 7.0) while it is processed in accordance with the present invention. The unbleached pulp from the decker, which is at a consistency of approximately 3–12%, may be transferred to diffusion tower 30 and held for a predetermined length of time and a predetermined elevated temperature. This soaking step is preferably conducted for at least 30 minutes at a temperature of at least 65° C., and more preferably at approximately 70° C. or higher. Upon exiting the first diffusion tower 30, a sodium hydroxide solution may be mixed into the pulp slurry to the extent needed to maintain the pH above 7. Preferably, the consistency is lowered to about 4%. The resulting slurry may be dewatered in a press 40 to a constituency of about 30% then diluted to a 10% consistency.

After the press 40, or the decker 20 if the tower 30 and press 40 are not used, the pulp is placed in a high-density storage or brown stock storage tank 50 in which it can reside anywhere from 15 to 430 minutes, but more preferably, for 120 minutes. The purpose of the high-density storage tank is to prevent flow variations from passing to the downstream processes.

After the high-density storage tank 50, the pulp is then introduced into the first of a series 60 of diffusion towers and treatments 70 at a consistency of approximately 3–12%. Hot water and steam or only steam are added to the pulp in the second of the series 60 of diffusion tanks to raise the temperature to a value that is preferably equal to or greater than 55° C. The pulp is then repetitively soaked in the remaining series 60 of diffusion towers. After soaking in each tower 60, the pulp is subjected to treatments 70. Preferably the pulp is soaked and washed or pressed multiple times, usually five (n=5) or six (n=6) times in a series of towers 60 and treatments 70, before it is forwarded to a storage tank 80. Each of the successive soaking and diffusion steps may take a minimum of 15 minutes but may take up to 300 or more minutes. These time periods include the treatment steps that follow each soaking step. This residence time is dependent on the size of the towers and level of pulp maintained in the towers.

It is preferred that the repetitive soaking steps in diffusion towers 60 occur for between about 220 minutes to 420 minutes and in either case at the elevated temperature of at least 55° C. It is also preferred that the temperatures in most of the towers in 60 be above 70° C. It is preferred that the total soaking time in diffusion tower 30, storage vessel 50, and diffusion towers 60 ranges from a minimum of 220 minutes (0–30 minutes in diffusion tower 30, 0–30 minutes in vessel 50, 220 minutes in diffusion towers 60) to a maximum of approximately 660 minutes (0–60 minutes in diffusion tower 30, 660 minutes in diffusion towers 60). Conventionally, however, the soak will occur for approximately 330–420 minutes (0 minutes in diffusion tower 30, 330–420 minutes in diffusion towers 60).

After the pulp has been repetitively soaked and treated, it may be forwarded to the storage tank 80. The pulp may reside in storage tank 80 for up to 430 minutes. However, generally it is preferred to have the pulp reside in storage tank 80 for about 100 minutes if the storage tank 80 is employed. In this storage tank, the pulp remains at a consistency of about 10%. Thereafter, the pulp is fed in a conventional manner to a conventional pulp machine 100 and dryer 110. After the pulp is dried into sheets, it is cut to size, sent to storage 120, and ultimately shipped to a customer.

The unbleached and washed pulp produced by the process of the present invention has a COD of less than or equal to 2.0 kg per metric ton (1,000 kg), and preferably less than 1.8 kg/1000 kg. This level of COD is well below that achieved in ordinary pulp mills and particularly in kraft pulp mills producing unbleached pulp. Also, it is preferred that the pulp produced by this process has a Kappa number less than 30 and preferably less than or equal to 25±3.

A critical feature of the present invention is that the pulp must be maintained at alkaline conditions from the time it begins the initial soaking in tower 30 until the pulp is dried. It is preferred that the pH be maintained at or above 8.0, and more preferably between 9–11, throughout the entire process, from the soaking in the initial diffusion tower 30 through the repetitive soaks in towers 60 and treatments 70. Preferably in these steps, the pH is maintained in the range of from 10.0 to 11.0. The pulp is then run through the pulp machine 100 and the dryer 110. In these steps, the pH may be reduced, e.g., to 8.0 to 8.5, but can be run lower. Under certain circumstances, it may be necessary to add caustic solution (20% by weight aqueous sodium hydroxide) after the first diffusion tower 30 or after one of the towers 60. It has been found that the addition of caustic at the rate of at least 2 kg per metric ton, and more preferably 4 kg per metric ton, will be sufficient to maintain the alkalinity of the pulp above pH 8.0 throughout the process. It is generally only necessary to add caustic during the initial portion of the run of the process. For example, at a throughput of about 25 to 40 tons per hour, the caustic needs to be added at the rate of 4 kg per metric ton for the initial 24 to 48 hour period that the pulp is run through the initial tower 30 during a multi-day run (up to ten days). This will assure that the alkalinity will be maintained above pH 8.0 throughout the entire process, which includes the drying stage.

Caustic may be added in line 32 after tower 30, if used. Alternatively or in addition, caustic may be added in line 34 after one of the towers 60. In one embodiment of the present invention, tower 30 and press 40 are not used and caustic is added after either the first or second tower 60.

In one preferred embodiment, the present invention is carried out in a bleach plant that is normally associated with a Kraft pulp mill and used to convert unbleached pulp to bleached pulp. A typical bleach plant has a series, typically five or more, of bleach reactors, in which various bleaching agents such as chlorine dioxide are added. The bleach reactors may employ a variety of flow characteristics, such as down flow, up flow and combinations thereof. An oxygen delignification reactor (diffusion tower 30) may precede the series of bleach reactors (diffusion towers 60). In accordance with the present invention, the bleach plant is converted to use with the present invention by first cutting off the supply of bleaching agents to the bleach reactor, and thereafter, the supply of bleaching agents to the bleach reactors is sequentially shut off as the pulp sequentially enters the bleach reactors.

In a preferred embodiment, caustic is introduced into the pulp via line 34 after one of the towers at 4 kg per metric ton of pulp. It is very important in this cycle that the temperature is maintained at or above 55° C., and in most towers, preferably above 70° C. This is accomplished by adding steam to the vessels, as necessary, to maintain temperatures. After soaking in each bleach reactor vessel, the pulp is run through conventional washing or pressing units (treatments 70) that normally follow each of the bleach reactors. In one embodiment, during the washing and pressing, the consistency may be increased to as high 30% or as low as 4%. Preferably, fresh water is used to wash the pulp; however, white water or clean hot water from the associated pulp plant may be used, if necessary.

After the pulp from the last bleach reaction vessel is washed, it is placed into the vessel that is normally used for bleached pulp storage (vessel 80). Thereafter, it is diluted in successive steps to a consistency of about 1.5% and fed into a pulp head box on the pulp machine 100. The dewatered sheet produced on the pulp machine is then run through the pulp dryer 110, for example, a Flakt dryer. After drying, the sheet is subsequently cut, stacked, stored, and, thereafter sent to shipping operations.

If desired, the pulp machine and pulp dryer can be eliminated and the pulp can be introduced directly into a jet dryer. The jet dryer produces a dried singulated fiber, particularly useful in some cementitious products. One suitable jet dryer for use in the present invention is a fluid energy Aljet Model Thermajet, X0870L, manufactured by Fluid Energy Processing and Equipment Company. It is also possible to completely skip the drying stage and use the pulp in a never-dried state.

The following examples are intended for illustrative purposes only and are not intended in any way limit the invention.

EXAMPLE 1

Chemical oxygen demand (COD) is determined by the following method. Pulp sheets produced in accordance with the preferred embodiment of the present invention just described are torn or cut into small pieces (approximately 4 cm square). The small pieces are mixed and the moisture is measured in accordance with Tappi procedure T412 om-94. Forty grams of pulp, oven dried weight, are then carefully weighed. A 2,000 ml solution of 0.01 N sodium hydroxide solution is prepared using distilled or deionized water and analytical grade sodium hydroxide. Thereafter, the pulp is placed in 2,000 ml of the 0.01 N sodium hydroxide solution and placed in a disintegrater and disintegrated for 15 minutes at 3,000 rpm in a British Pulp Evaluation Apparatus (or British disintegrator) described in Tappi 205 sp-95. The pulp slurry is then vacuum filtered immediately after disintegration using a Whatman No. 3 filter paper. The filtration time is long enough so that a majority of the filtrate is passed through the filter. Two hundred and fifty ml of filtrate is separated for COD analysis. A sample is preserved with 2.5 ml of 50% sulfuric acid. Thereafter, the COD of the filtrate is measured using the titration method described in *Standard Methods for the Examination of Water and Wastewater*, 20th Edition, 1998, Method #5220C, "Closed Reflux, Titrimetric Method". The COD content is then calculated as kilograms per metric ton of pulp based on the oven dried weight of the pulp.

Pulp samples were randomly selected from several production runs through a converted bleach plant with five towers (n=5). Initially, unbleached Southern Pine pulp was processed in a brownstock washer 10 and a brown stock decker 20 at a consistency of approximately 10% when it exited from the decker, then introduced into brownstock storage. Then, the pulp was introduced into a converted bleach plant. After each of the first two towers in the series, press washers provided treatment to the pulp. After each of the last three towers, diffusion washers provided treatment to the pulp. In each of the press washers, the pulp consistency was changed from about 10% to about 30% then diluted back to 10%.

The pulp was run at the rate of 29 tons per hour through the converted bleach plant. Caustic was added after the first tower at a rate of 4 kg per metric ton of pulp. Residence times in the five successive bleach vessels were 30, 75, 30, 45, and 150 minutes respectively. Temperatures in the five successive bleach vessels were 75° C., 75–80° C., 75–80° C., 75–80° C., and 75–80° C., respectively. Pulp samples were taken during production runs downstream from the Flakt pulp dryer and tested for COD as set forth above. Samples A, B, C, D, E, F, G, H and I were taken over a one-day production period. The results are set forth below.

| SAMPLE ID | COD (kg/metric ton) |
|---|---|
| A | 1.5 |
| B | 1.65 |
| C | 1.5 |
| D | 1.6 |
| E | 1.5 |
| F | 1.6 |
| G | 1.6 |
| H | 1.5 |
| I | 1.3 |

The pulp produced in accordance with the foregoing example is suitable for incorporation into cementious products, such as panels, planks, tilebacker boards and ceramic tile underlayment, exhibiting excellent strength properties. The pulp may be incorporated into these products at about 6–10% by weight pulp using the Hatschek process. More preferably, the pulp may be incorporated into these products at about 8% by weight.

EXAMPLE 2

Pulp samples were randomly selected from several production runs through the converted bleach plant with six towers. Initially, TYEE pulp was processed in a brownstock washer 10 and a brown stock decker 20 at a consistency of approximately 10–12%. Then, the pulp was introduced into a high density storage 50. It was then diluted to about 4% with hot clean water. After the storage 50, the pulp was introduced into a converted bleach plant. After each of the six towers in the series, washers provided treatment to the pulp. In each treatment, the pulp consistency was changed from about 4% to about 10% then back to 4%.

The pulp was run at the rate of 15 tons per hour through the converted bleach plant. Caustic was added after the second tower at a rate of 4 kg per metric ton of pulp. Residence times in the five successive bleach vessels were 45, 15, 60, 120, 60 and 120 minutes, respectively. Temperatures in the six successive bleach vessels were 55° C., 65° C., 75–80° C., 75–80° C., 75–80° C., and 75–80° C., respectively. Pulp samples were taken during production runs downstream from the Flakt pulp dryer and tested for COD as set forth above. Samples A, B and C were taken over a one-day production period. The results are set forth below.

| SAMPLE ID | COD (kg/metric ton) |
|-----------|---------------------|
| A | 1.47 |
| B | 1.37 |
| C | 1.42 |

The pulp produced in accordance with the foregoing example is suitable for incorporation into cementious products, such as panels, planks, tilebacker boards and ceramic tile underlayment, exhibiting excellent strength properties. The pulp may be incorporated into these products at about 6–10% by weight pulp using the Hatschek process. More preferably, the pulp may be incorporated into these products at about 8% by weight.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for making pulp, comprising repetitively soaking and washing unbleached pulp containing sugars and other organic materials in water that is maintained at an alkaline condition at an elevated temperature to produce a pulp product having the sugars and other organic materials reduced such that the pulp product has a COD that is less than or equal to 2.0 kg per 1000 kg dry pulp, adding caustic to the pulp during the soaking and washing, and thereafter drying the pulp while maintaining alkaline conditions.

2. The process of claim 1, wherein the pulp product has a COD that is less than 1.8 kg per 1000 kg dry pulp.

3. The process of claim 1, wherein said pulp is repetitively soaked and washed for at least 220 minutes.

4. The process of claim 3, wherein said pulp is maintained at a temperature of at least 70° C. for at least a portion of said 220 minutes.

5. The process of claim 1, wherein said pulp before washing has a Kappa number of $\leq 30$.

6. The process of claim 1, wherein said pulp after washing has a Kappa number of $\leq 30$.

7. The process of claim 6, wherein said pulp after washing has a Kappa number less than or equal to $25\pm 3$.

8. The process of claim 1, wherein the repetitive soaking and washing is carried out in towers and washers of a multi-stage bleach plant wherein bleaching agents are not supplied to the bleach plant.

9. The process of claim 1, wherein sodium hydroxide is the caustic.

10. The process of claim 1, wherein the caustic is added at a rate of 4 kg per 1000 kg of dry unbleached pulp.

11. The process of claim 1, wherein the pulp is maintained at a pH greater than or equal to 8.0.

12. The process of claim 1, wherein the pulp is comprised of Douglas Fir pulp.

13. The process of claim 1, wherein the pulp is comprised of mini-chip pulp.

14. The process of claim 1, wherein the pulp is a Kraft pulp.

* * * * *